Patented Jan. 2, 1951

2,536,957

UNITED STATES PATENT OFFICE 2,536,957

PROCESS OF MAKING METALLIFEROUS AZO DYESTUFFS

Henri Riat and Hans Mayer, Basel, Switzerland, assignors to Ciba Limited, Basel, Switzerland, a Swiss firm No Drawing. Application October 8, 1947, Serial No. 778,734. In Switzerland October 17, 1946

12 Claims. (Cl. 260—148)

This invention is based on the observation that metalliferous dyestuffs can be made in an advantageous manner by treating an ortho-alkoxy-ortho'-hydroxy-azodyestuff, which contains at least one sulphonic acid group and at least two azo-groups, with an agent yielding metal in the presence of an aliphatic amine containing a hydroxyl group until the alkoxy group or groups present in the ortho-alkoxy-ortho'-hydroxy-azo grouping or groupings are split up.

The ortho - alkoxy - ortho' - hydroxy - azodyestuffs used as starting materials in the present invention contain, for example, in at least one position in the molecule the grouping

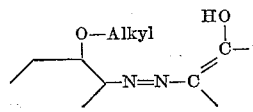

in which the alkyl residue advantageously belongs to the lower aliphatic series, and is accordingly, for example, a methyl or ethyl group. A large number of such dyestuffs, which contain the aforesaid grouping at two positions in the dyestuff molecule, can be obtained by coupling a tetrazotised 4:4'-diamino-3:3'-dialkoxydiphenyl, especially tetrazotised 4:4'-diamino-3:3'-dimethoxydiphenyl, with azo-components capable of coupling in ortho-position with respect to a hydroxyl group, the two azo-components being the same or different. As examples of such azo-components there may be mentioned hydroxynaphthalene sulphonic acids, such as 1-hydroxynaphthalene-3- or -4- or -5-sulphonic acid, 2-hydroxynaphthalene-4- or -6-sulphonic acid, 1-hydroxynaphthalene-3:6- or -3:8- or -4:8-disulphonic acid, 2-hydroxynaphthalene-3:6- or -5:7-disulphonic acid, and also especially aminonaphthol sulphonic acids and substitution products thereof such as 1-amino-8-hydroxynaphthalene-4-sulphonic acid, 1-amino-8-hydroxynaphthalene-6-sulphonic acid, 1-amino-5-hydroxynaphthalene-7-sulphonic acid, 2-amino-5-hydroxynaphthalene-7-sulphonic acid, and especially 1-amino-8-hydroxynaphthalene disulphonic acids in which the sulphonic acid groups may occupy, for example, the 2:4-, 3:6- or 4:6-positions.

Valuable metalliferous dyestuffs are also obtained in accordance with the present invention by starting from disazo-dyestuffs obtained by coupling a tetrazotised 4:4'-diamino-3:3'-dialkoxydiphenyl with one of the above named hydroxynaphthalene sulphonic acids, on one hand, and with another azo-component capable of coupling in ortho-position with respect to a hydroxyl group, for example, a 1-sulphophenyl-3-methyl-5-pyrazolone, on the other.

Azo-dyestuffs, which contain the above defined grouping in at least one position in the molecule, can be obtained by coupling any desired diazo-component with an azo-component capable of coupling in para-position with respect to an amino group, if the latter azo-component contains an alkoxy group in ortho-position with respect to the amino group determining the coupling, and diazotising the resulting dyestuff and coupling with an azo-component capable of coupling in ortho-position with respect to a hydroxyl group. As an example there may be mentioned the dyestuff of the formula

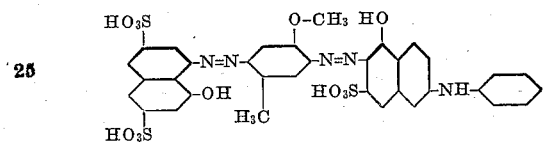

As agents yielding metal there may be used in the present process those of which the metals are suitable for forming complexes with ortho:ortho'-dioxy-azo-dyestuffs, that is to say, especially compounds of metals having an atomic number ranging from 24 to 30 (chromium, manganese, iron, cobalt, nickel, copper, zinc). In many cases especially favourable results are obtained by using a metal having an atomic number ranging from 27 to 29 (cobalt, nickel, copper), and especially by using copper compounds.

As aliphatic amines containing a hydroxyl group there may be used in the present process more especially such amines of which the alkyl group contains only few carbon atoms, for example, 2 carbon atoms. As examples of amines of this kind which are readily available technically there may be mentioned mono-, di- and triethanolamine.

The treatment of the azo-dyestuffs used as starting materials with agents yielding metal may be carried out in the presence of an amine of the aforesaid kind advantageously in an aqueous medium at a raised temperature. In this case the reaction solution may be prepared, for example, by adding to the solution of the azo-dyestuff a complex solution of the metal concerned which complex solution has been obtained by mixing an aqueous solution of a salt of the metal (for example, a copper sulphate solution) with the necessary quantity (as hereinafter described) of an ethanolamine. In many cases, however, it is of advantage first to prepare from the compound, for example, a salt, of the metal used with the aid of ammonia a complex ammine compound soluble in an alkaline medium, since the hydroxides of these metals are otherwise insoluble in alkaline media, and then to unite the complex ammine compound with a solution containing the dyestuff and the ethanolamine.

The reaction is advantageously conducted at a raised temperature, for example, at 80–90° C. or in a reflux apparatus, or under pressure at a temperature above 100° C. The reaction is complete when the alkoxy groups have been split up, which can be recognised when the colour of the reaction solution undergoes no further change upon continuing the treatment at the temperature requisite for the reaction.

For carrying out the present process it is generally necessary to use at least the quantity of ethanolamine required to convert the metal salt into the metal ammine complex. In some cases an increase in the quantity of ethanolamine leads to still further improved results, a large excess being in no way injurious.

The course of the reaction and the favourable effect of the present process are as yet not completely understood. It appears, however, that the metal compound primarily formed when the starting dyestuff and the metallising agent are brought together surprisingly exhibit a better solubility in the presence of ethanolamine than the metal compounds obtained by the known methods, but it is not certain whether the ethanolamine becomes part of the metal compound primarily formed or serves in some other manner as a solution promoter.

The present process enables metal compounds of ortho:ortho'-dihydroxy-azo-dyestuffs to be made, accompanied by the splitting up of the alkoxy groups present in the initial dyestuffs, in such a way that there is considerable protection of the dyestuff molecule without the need for additional precautions, whereas this is often not possible in the absence of aliphatic amines containing hydroxyl groups with other copper tetrammine salts (ammoniacal copper oxide). In many cases there is obtained a purer product and/or a better yield than is obtained by the known processes.

The present process is of special advantage, as compared with the known processes, in the case of starting materials which contain a grouping which is sensitive to heat in an alkaline medium, for example, an NH₂-group in peri-position with respect to an HO-group, as is the case, for instance, with azo-dyestuffs which contain as a coupling component a 1-amino-8-hydroxynaphthalene sulphonic acid, for example, 1-amino-8-hydroxynaphthalene-3:6- or -2:4-disulphonic acid. Among dyestuffs of this kind there are to be mentioned principally those which have been made from a tetrazotised 4:4'-diamino-3:3'-dialkoxydiphenyl.

The complex metal compounds of ortho:ortho'-dihydroxy-azo-dyestuffs by the present process are in part known. They are metalliferous azo-dyestuffs which contain sulphonic acid groups, and at least two azo-groups and at least once the atomic grouping of the probable formula

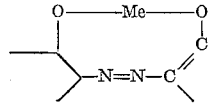

in which Me represents a metal having an atomic number ranging from 24 to 30, preferably from 27 to 29, and which dyestuffs, as compared with the corresponding dyestuffs of the same constitution obtainable by known processes, are, as a rule, distinguished by being substantially free from grey coloured impurities when tested by capillary analysis.

It is in particular the cupriferous dyestuffs obtainable under the present process and corresponding to the general formula

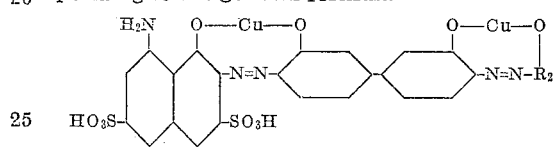

in which R₂ stands for the radical of a naphthalene sulphonic acid wherein the —N=N-group and the —O—Cu—O-group stand in one of the positions 1,2 and 2,1 to each other, which exhibit this advantage. The dyestuffs can be tested by capillary analysis in the following manner: 0.15 gram of dyestuff is dissolved in 100 cc. of aqueous sodium hydroxide solution of 0.2 per cent. strength and the temperature adjusted to 20° C. A piece of filter paper is then hung over the solution with the lower end dipped into it to a depth of 0.5 cm. and is so left at 20° C. until the ascent of the liquid ceases, which is the case after 1½ to 2 hours. The paper is then removed and dried in the air. In this test, the coloured part of the filter paper, in the case of the cupriferous dyestuffs of the above indicated composition which are obtained by the known processes, shows an upper zone of several centimeters which is greyer than the lower zone. The impurities which are thus easily proved to be present in the dyestuffs pass over to the fiber during the dyeing process and naturally are responsible for a duller shade of the dyeing. In contrast to this, the cupriferous dyestuffs of the above composition which are obtained by the present process produce substantially no grey zone on the filter paper in this test and consequently make purer dyeings. As examples of known processes there may be mentioned in this connection U. S. Patent 1,940,066, British Patent No. 575,437 and Swiss Patent No. 241,415.

The complex metal compounds obtained by the present process are as a rule suitable for the substantive dyeing of cellulosic fibers such as cotton, linen and artificial silk and staple fibers of regenerated cellulose and, for the foregoing reason, yield especially pure tints. In many cases the copper compounds exhibit especially favourable properties. In some circumstances it is of advantage to prepare the complex zinc compounds, or then the metal bound in complex union can be split off when the metal-free ortho:ortho'-dihydroxy-azo-dyestuff is desired.

The following examples illustrate the invention, the parts being by weight:

*Example 1*

100 parts of the sodium salt of the dyestuff, obtained by coupling one molecular proportion of tetrazotised 3:3' - dimethoxy - 4:4' - diaminodiphenyl with two molecular proportions of 1:8-amino-naphthol-3:6-disulphonic acid in a medium rendered alkaline with sodium carbonate, are dissolved in 4000 parts of water with the addition of 400 parts of diethanolamine. There are then added 200 parts of an ammoniacal solution of copper sulphate (corresponding to 50 parts of $CuSO_4.5H_2O$ and 13.6 parts of $NH_3$), and the whole is heated for 14 hours at 80-90° C. The whole is cooled to 40° C. and the dyestuff is isolated by the addition of sodium chloride. After drying a dark blue powder is obtained, which dissolves in water with a greenish blue coloration and dyes cotton pure greenish blue tints which are fast to light.

A similar dyestuff is obtained by using 1:8-aminonaphthol - 2:4- or -4:6 - disulphonic acid, instead of 1:8-aminonaphthol-3:6-disulphonic acid. By using nickel sulphate, instead of copper sulphate, a dyestuff is obtained which yields similar but somewhat redder dyeings on cotton.

*Example 2*

98 parts of the sodium salt of the dyestuff, obtainable by coupling one mol of tetrazotised 3:3'-dimethoxy-4:4'-diaminodiphenyl first with one mol of 1-hydroxynaphthalene-3:6-disulphonic acid and then with one mol of 1:8-aminonaphthol-3:6-disulphonic acid, are dissolved in 4000 parts of water with the addition of 300 parts of triethanolamine. There are then added a solution prepared from 50 parts of crystallised copper sulphate, 60 parts of aqueous ammonia solution (specific gravity 0.88) and 150 parts of water, and the whole is heated for several hours at 80-90° C. until the formation of the complex is complete. The solution is cooled to 40° C. and the dyestuff is precipitated therefrom by the addition of sodium chloride, filtered and washed. It dissolves in water with a blue coloration, and dyes cotton pure blue tints which are fast to light.

By using instead of 1-hydroxynaphthalene-3:6-disulphonic acid, for example, 1-hydroxynaphthalene-3:8-disulphonic acid or 2-hydroxynaphthalene-3:6- or -6:8-disulphonic acid, there is obtained a dyestuff having similar properties.

*Example 3*

100 parts of the sodium salt of the dyestuff, obtained by coupling one mol of tetrazotised 3:3'-dimethoxy-4:4'-diaminodiphenyl with one mol of 1:8 - dihydroxynaphthalene-3:6-disulphonic acid and one mol of 1:8-aminonaphthol-3:6-disulphonic acid, are dissolved in 4000 parts of water. The solution is then mixed with 50 parts of crystallised copper sulphate dissolved in 200 parts of water and 60 parts of monoethanolamine, and the whole is heated for 12 hours at 80-90° C. After cooling, the dyestuff is salted out, filtered and dried. It dissolves in water with a green-blue coloration and dyes cotton pure greenish blue tints which are fast to light.

*Example 4*

87.5 parts of the sodium salt of the dyestuff, obtained by coupling one mol of tetrazotised 3:3'-dimethoxy-4:4'-diaminodiphenyl with one mol of 2-hydroxynaphthalene-4-sulphonic acid and one mol of 1:8-amino-naphthol-3:6-disulphonic acid, are dissolved in 4000 parts of water with the addition of 300 parts of diethanolamine. The whole is then mixed with a solution prepared from 50 parts of crystallised copper sulphate, 60 parts of aqueous ammonia solution (specific gravity 0.88) and 150 parts of water, and heated for several hours at 80-90° C. The whole is then cooled to 40° C., sodium chloride is added, and the dyestuff is separated by filtration. After drying, a dark blue powder is obtained, which dissolves in water with a blue coloration and dyes cotton from a bath containing sodium sulphate pure blue tints which are fast to light.

*Example 5*

89 parts of the sodium salt of the dyestuff, obtained by coupling one mol of tetrazotised 3:3'-dimethoxy-4:4'-diaminodiphenyl with one mol of 2-amino-5-hydroxynaphthalene-7-sulphonic acid and one mol of 1:8-aminonaphthol-3:6-disulphonic acid, are dissolved in 4000 parts of water with the addition of 400 parts of diethanolamine. 200 parts of an ammoniacal solution of copper sulphate (corresponding to 50 parts of

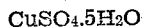

and 13.6 parts of $NH_3$) are then added, and the whole is heated for 16-20 hours at 80-90° C. After cooling, the dyestuff is salted out, separated by filtration, and dried. It dissolves in water with a greenish blue coloration and dyes cotton blue tints which are fast to light.

By using, instead of the 2-amino-5-hydroxynaphthalene-7-sulphonic acid, another component such as 2-amino-8-hydroxynaphthalene-6-sulphonic acid or 1-amino-8-hydroxynaphthalene-4-sulphonic acid or 1-amino-5-hydroxynaphthalene-7-sulphonic acid there is obtained a dyestuff having similar properties.

*Example 6*

99 parts of the sodium salt of the dyestuff, obtained by coupling one mol of tetrazotised 3:3'-dimethoxy-4:4'-diaminodiphenyl with one mol of 1:8-aminonaphthol-3:6-disulphonic acid and one mol of 2-phenylamino-5-hydroxynaphthalene-7-sulphonic acid, are dissolved in 3000 parts of water with the addition of 200 parts of ethanolamine. An ammoniacal solution of copper sulphate, consisting of 50 parts of crystallised copper sulphate, 80 parts of ammonia solution of 25 per cent strength and 150 parts of water, is then added, and the whole is heated for 16 hours at 80-90° C. The dyestuff is then salted out, separated by filtration, and dried. It is a dark powder which dissolves in water with a green-blue coloration and dyes cotton pure greenish blue tints. The dyeings possess, in addition to good properties of fastness to washing, an excellent fastness to light.

*Example 7*

90.5 parts of the sodium salt of the dyestuff, obtained by coupling one mol of tetrazotised 3:3'-dimethoxy-4:4'-diaminodiphenyl with one mol of 1:8-aminonaphthol-3:6-disulphonic acid and one mol of 1-phenyl-3-methyl-5-pyrazolone-4'-sulphonic acid, are dissolved in 3000 parts of water with the addition of 150 parts of ethanolamine. 50 parts of crystallised copper sulphate dissolved in 150 parts of water and 80 parts of ammonia solution of 25 per cent strength are added, and the whole is heated for 6 hours at 80-90° C. The solution is then neutralised with a small quantity of hydrochloric acid of 30 per cent strength, the dyestuff is salted out, separated by filtration, and dried. It dissolves in water with a red-blue coloration and dyes cotton reddish blue tints.

Example 8

8.6 parts of the sodium salt of the disazo-dyestuff having the constitution

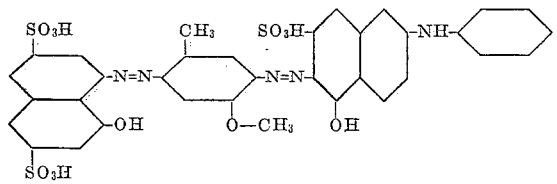

are dissolved in 200 parts of warm water, mixed with 20 parts of triethanol amine, and, after the addition of an ammoniacal copper solution consisting of 3 parts of crystallised copper sulphate, 10 parts of water and 4 parts of an aqueous solution of ammonia of 24 per cent. strength, the whole is heated for 12–14 hours at 90–95° C. The resulting copper compound is then precipitated with dilute hydrochloric acid, separated by filtration, and converted in the usual manner into its sodium salt. In the dry state the dyestuff is a blackish powder which dissolves in water with a blue coloration and in concentrated sulphuric acid with a blue-green coloration. On vegetable fibers it yields blue dyeings which are fast to light.

Example 9

A dyebath is prepared from 3000 parts of water with 1.5 parts of the dyestuff obtained as described in the first paragraph of Example 1, 2 parts of anhydrous sodium carbonate and 30 parts of crystallised sodium sulphate. 100 parts of cotton are entered at 40° C., the temperature is raised to 95° C., and dyeing is carried on at that temperature for one hour. The cotton is then rinsed, and finished in the usual manner. It is dyed greenish blue tints which are fast to light.

What we claim is:

1. Process for the manufacture of a metalliferous dyestuff, which comprises treating a disazo dyestuff of the general formula $$R_1-N=N-R-N=N-R_2$$

in which R represents a diphenyl radical to which the azo-groups are bound in the 4- and 4'-positions and which carries an alkoxy group in each of the 3- and 3'-positions, $R_1$ and $R_2$ each represents the radical of a coupling component bound to the azo group in a position vicinal to a hydroxyl group in the presence of an ethanolamine with an agent yielding metal until the alkoxy groups present in the ortho-alkoxy-ortho'-hydroxy-groupings are split up.

2. Process for the manufacture of a metalliferous azo-dyestuff which comprises treating a disazo dyestuff of the general formula $$R_1-N=N-R-N=N-R_2$$

in which R represents a diphenyl radical to which the azo-groups are bound in the 4- and 4'-positions and which carries an alkoxy group in each of the 3- and 3'-positions, $R_1$ represents a naphthalene radical containing at least one sulphonic acid group to which the azo-group is bound in 2-position and which carries in the 1-position an —OH-group and in 8-position an —NH$_2$-group, and $R_2$ represents the radical of a coupling component bound to the azo-group in a position vicinal to a hydroxyl group, in the presence of an ethanolamine with an agent yielding metal until the alkoxy-groups present in the ortho-alkoxy-ortho'-hydroxy-groupings are split up.

3. Process for the manufacture of a metalliferous azo-dyestuffs which comprises treating a disazo-dyestuff of the general formula

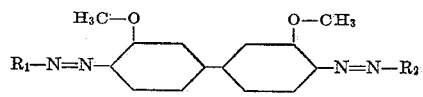

in which $R_1$ represents a naphthalene radical containing at least one sulphonic acid group to which the azo-group is bound in 2-position and which carries in the 1-position an —OH-group and in 8-position an —NH$_2$-group, and $R_2$ represents the radical of a coupling component bound to the azo-group in a position vicinal to a hydroxyl group, in the presence of an ethanolamine with an agent yielding metal until the alkoxy-groups present in the ortho-alkoxy-ortho'-hydroxy-groupings are split up.

4. Process for the manufacture of a metalliferous azo-dyestuff which comprises treating a disazo-dyestuff of the general formula

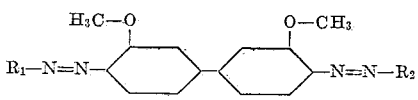

in which $R_1$ represents a naphthalene radical containing at least one sulphonic acid group to which the azo-group is bound in 2-position and which carries in the 1-position an —OH-group and in 8-position an —NH$_2$-group, and $R_2$ represents the radical of a hydroxynaphthalene sulphonic acid bound to the azo-group is a position vicinal to a hydroxyl group, in the presence of an ethanolamine with an agent yielding metal until the alkoxy-groups present in the ortho-alkoxy-ortho'-hydroxy-groupings are split up.

5. Process for the manufacture of a metalliferous azo-dyestuff which comprises treating a a disazo-dyestuff of the general formula

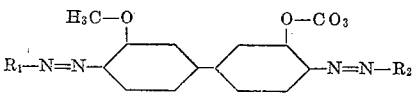

in which $R_1$ represents a naphthalene radical containing two sulphonic acid groups to which the azo-group is bound in 2-position and which carries in 1-position an —OH-group and in 8-position an —NH$_2$-group, and $R_2$ represents the radical of a hydroxynaphthalene sulphonic acid bound to the azo-group in a position vicinal to a hydroxyl group, in the presence of an ethanolamine with an agent yielding metal until the alkoxy groups present in the ortho-alkoxy-ortho'-hydroxy-groupings are split up.

6. Process for the manufacture of a metalliferous azo-dyestuff which comprises treating a disazo-dyestuff of the general formula

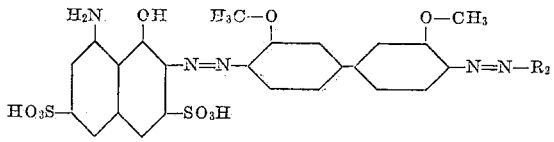

in which $R_2$ represents the radical of a hydroxynaphthalene sulphonic acid bound to the azo-group in a position vicinal to a hydroxyl group, in the presence of an ethanolamine with an agent yielding metal until the alkoxy group present in the ortho-alkoxy-ortho'-hydroxy-groupings are split up.

7. Process for the manufacture of a metalliferous azo-dyestuff which comprises treating a disazo-dyestuff of the general formula

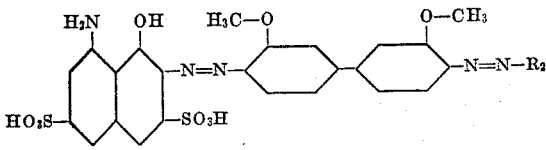

in which $R_2$ represents the radical of a hydroxynapthalene sulphonic acid bound to the azo-group in a position vicinal to a hydroxyl group, in the presence of an aliphatic amine of the general formula

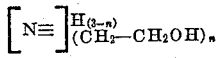

in which $n$ stands for and integer ranging from 1 to 3 with an agent yielding metal until the alkoxy groups present in the ortho-alkoxy-ortho'-hydroxy-groupings are split up.

8. Process for the manufacture of a metalliferous azo-dyestuff which comprises treating a disazo-dyestuff of the general formula

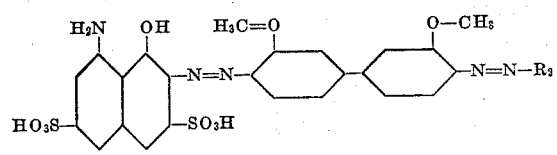

in which $R_2$ represents the radical of a hydroxynaphthalene sulphonic acid bound to the azo-group in a position vicinal to a hydroxyl group, in the presence of an aliphatic amine of the general formula

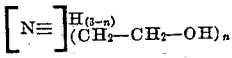

in which $n$ stands for an integer ranging from 1 to 3 with an agent yielding a metal having an atomic number ranging from 27 to 29 until the alkoxy groups present in the ortho-alkoxy-ortho'-hydroxy-groupings are split up.

9. Process for the manufacture of a cupriferous azo-dyestuff which comprises treating a disazo-dyestuff of the general formula

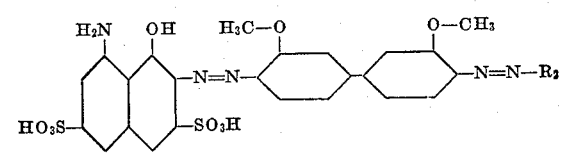

in which $R_2$ represents the radical of a hydroxynaphthalene sulphonic acid bound to the azo-group in a position vicinal to a hydroxyl group, in the presence of an aliphatic amine of the general formula

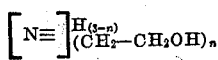

in which $n$ stands for an integer ranging from 1 to 3 with an agent yielding copper until the alkoxy groups present in the ortho-alkoxy-ortho'-hydroxy-groupings are split up.

10. Process for the manufacture of a cupriferous dyestuff which comprises treating the disazo-dyestuff of the formula

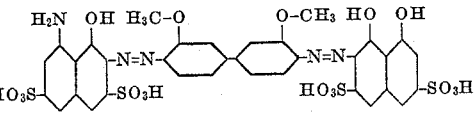

in the presence of an aliphatic amine of the general formula

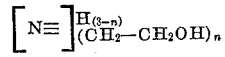

in which $n$ stands for an integer ranging from 1 to 3 with an agent yielding copper until the alkoxy groups are split up.

11. Process for the manufacture of a cupriferous dyestuff which comprises treating the disazo-dyestuff of the formula

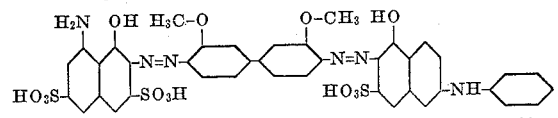

in the presence of an aliphatic amine of the general formula

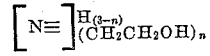

in which $n$ stands for an integer ranging from 1 to 3 with an agent yielding copper until the alkoxy groups are split up.

12. Process for the manufacture of a cupriferous dyestuff which comprises treating the disazo-dyestuff of the formula

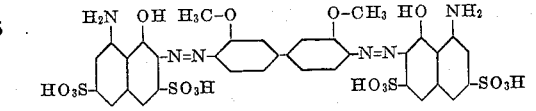

in the presence of an aliphatic amine of the general formula

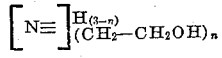

in which $n$ stands for an integer ranging from 1 to 3 with an agent yielding copper until the alkoxy groups are split up.

HENRI RIAT.
HANS MAYER.

REFERENCES CITED

The following references are of record in the file of this patent:

UNITED STATES PATENTS

| Number | Name | Date |
|---|---|---|
| 1,693,448 | Krzikalla et al. | Nov. 27, 1928 |
| 1,940,066 | Stusser | Dec. 19, 1933 |
| 2,092,429 | Straub et al. | Sept. 7, 1939 |
| 2,180,776 | Straub et al. | Nov. 21, 1939 |
| 2,203,196 | Hanhart | June 4, 1940 |
| 2,230,686 | Holzach et al. | Feb. 4, 1941 |
| 2,243,020 | Straub | May 20, 1941 |
| 2,353,411 | Miller | July 11, 1944 |
| 2,400,092 | Anderson | May 14, 1946 |
| 2,426,977 | Straub et al. | Sept. 9, 1947 |
| 2,424,066 | Straub | July 15, 1947 |

FOREIGN PATENTS

| Number | Country | Date |
|---|---|---|
| 113,141 | Great Britain | Feb. 8, 1918 |

Certificate of Correction

Patent No. 2,536,957 January 2, 1951

HENRI RIAT ET AL.

It is hereby certified that error appears in the printed specification of the above numbered patent requiring correction as follows:

Column 8, line 4, for "azo-dyestuffs" read *azo-dyestuff*; column 9, line 20, for the word "and" read *an*; lines 27 and 28, for that portion of the formula reading $$\text{"H}_2\text{C=O"} \quad \text{read} \quad \text{H}_2\text{C-O}$$

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*